United States Patent
Hayashi

(10) Patent No.: US 8,662,768 B2
(45) Date of Patent: Mar. 4, 2014

(54) IMAGE FORMING DEVICE

(75) Inventor: Akihiro Hayashi, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1077 days.

(21) Appl. No.: 11/964,366

(22) Filed: Dec. 26, 2007

(65) Prior Publication Data

US 2008/0158624 A1 Jul. 3, 2008

(30) Foreign Application Priority Data

Dec. 27, 2006 (JP) ................................. 2006-351316

(51) Int. Cl.
*B41J 11/44* (2006.01)
*G03G 15/00* (2006.01)

(52) U.S. Cl.
USPC ................. 400/76; 399/86; 399/23; 399/196; 399/391

(58) Field of Classification Search
USPC .................. 400/76; 399/85, 86, 391, 196, 23; 358/1.2, 1.6
See application file for complete search history.

(56) References Cited

U.S. PATENT DOCUMENTS 6,930,796 B1    8/2005    Matsuura et al.

FOREIGN PATENT DOCUMENTS

| JP | H06-316123 A | 11/1994 |
|---|---|---|
| JP | H07-223341 A | 8/1995 |
| JP | H09-254485 A | 9/1997 |
| JP | H10-000836 A | 1/1998 |
| JP | 2000-272206 A | 10/2000 |
| JP | 2000-318270 A | 11/2000 |
| JP | 2001-018494 A | 1/2001 |
| JP | 2001-058445 A | 3/2001 |
| JP | 2006-092165 A | 4/2006 |

OTHER PUBLICATIONS

Japan Patent Office; Notification of Reasons of Rejection in Japanese Patent Application No. 2006-351316 mailed Oct. 6, 2009.
Japan Patent Office, Notification of Reasons of Rejection in Japanese Patent Application No. 2006-351316 mailed Jan. 13, 2009.
Japan Patent Office; Decision of Rejection in Japanese Patent Application No. 2006-351316 mailed Jun. 9, 2009.

*Primary Examiner* — Matthew G Marini
(74) *Attorney, Agent, or Firm* — Baker Botts L.L.P.

(57) ABSTRACT

An image forming device is provided with a sheet feeding unit capable of selectively feeding recording sheets of a plurality of sizes, a print unit configured to print out images represented by print data on page-by-page basis, the print data including information of designated size of the recording sheets. On condition that running out of the recording sheets of the designated size in the sheet feeding unit is detected during printing out of the images, the sheet feeding unit starts feeding the recording sheets of a substitute size which is different from the designated size and the print unit continues printing out of images represented by remaining part of the print data on the recording sheet of the substitute size. A storing unit stores the remaining part of the print data after printing, but not part of the print data printed on the recording sheets of designated size.

13 Claims, 12 Drawing Sheets

35

| DESIGNATED SIZE | FIRST SUBSTITUTE SIZE | SECOND SUBSTITUTE SIZE |
|---|---|---|
| A3 | B4 | A4 |
| B4 | A3 | A4 |
| A4 | A3 | B4 |
| B5 | A4 | B4 |
| A5 | A4 | A3 |

FIG. 2

IMAGE FORMING DEVICE

CROSS-REFERENCE TO RELATED APPLICATION

This application claims priority under 35 U.S.C. §119 from Japanese Patent Application No. 2006-351316 filed on Dec. 27, 2006. The entire subject matter of the application is incorporated herein by reference.

BACKGROUND

1. Technical Field

The following description relates to an image forming device which prints out input print data on a page-by-page basis.

2. Related Art

Conventionally, there is known an image forming system which includes a print server, which converts print data input from a terminal device into raster data, and a printing device that executes printing based on the raster data. An example of such an image forming system is disclosed in Japanese Patent Provisional Publication No. 2006-92165 (hereinafter, referred to as '165 publication). The print server detects running out of recording sheets used for printing the raster data. The print server retains raster data which cannot be printed on the recording sheets due to running out thereof, while the print server outputs other raster data for recording sheets which do not run out. The print server outputs the retained raster data to the printing device after the running out condition is resolved. Thus, the raster data for the recording sheets that do not run out are preferentially printed by the printing device.

Japanese Patent Provisional Publication No. 2001-18494 (hereinafter, referred to as '494 publication) discloses a printing device which changes a size of recording sheets to be used when running out of the recording sheet is found while executing printing of print data received from the terminal device. The printing device determines an designated size of the recording sheets to be used based on information contained in the print data. The printing device executes printing on a page-by-page basis normally using the recording sheets of the designated size. According to '494 publication, if the recording sheets of the designate size run out, the printing device executes printing using recording sheets of a different size from the designated size.

SUMMARY OF THE INVENTION

In a conventional printer as disclosed in '165 publication, when running out of the recording sheets occurs while executing a print job, a next print job using recording sheets of a different size is executed prior to the print job requiring the recording sheets which is running out. Therefore, there is a problem where a user who instructed the print job cannot obtain a printed result until the prioritized print job is finished.

The printing device disclosed in '494 publication uses recording sheets of a different size from the designated size, when running out of the designated size sheets happens while executing printing. Thereby, according to '494 publication, the printing result can be obtained without supplying recording sheets of the designated size. However, in a case that a user needs a printing result output on the recording sheets of designated size, the user should return to the terminal device to instruct re-printing after supplying recording sheet of the designated size to the printing device. This is particularly inconvenient to the user if the terminal device and the printer are located in distant places.

Considering the above described background, the present invention is advantageous in that there is provided an improved image forming device which is capable of avoiding discontinuation of a print job caused by running our of the recording sheets and continuing the print job by printing the print data on the recording sheets of the designated size. Further, it the print data printed on the recording sheets of the designated size is necessary, reprinting can be executed without re-transmitting the print data which has been output on recording sheets of a different size.

According to aspects of the present invention, there is provided an image forming device provided with a sheet feeding unit capable of selectively feeding recording sheets of a plurality of sizes, a print unit configured to print out images represented by print data on page-by-page basis, the print data including information of designated size of the recording sheets, a control unit configured to control the sheet feeding unit to feed the recording sheets of the designated size and control the print unit to execute printing based on the print data, a first detecting unit configured to detect running out of the recording sheets of the designated size in the sheet feeding unit, and a storing unit configured to store the print data. On condition that the first detecting unit detects running out of the recording sheets of the designated size in the sheet feeding unit during printing out of the images, the control unit controls the sheet feeding unit to start feeding the recording sheets of a substitute size which is different from the designated size and controls the print unit to continue printing out of images represented by remaining part of the print data, which was not printed on the recording sheets of the designated size, on the recording sheet of the substitute size. Further, the storing unit stores the remaining part of the print data even after the remaining part of the print data was printed on the recording sheets of the substitute size, while the storing unit does not store part of the print data which is printed on the recording sheets of the designated size.

According to the invention, when running out of the recording sheets of the designated size occurs, printing is continued using the recording sheets of a substitute size. Therefore, without discontinuing print job even if running out of the recording sheets of the designated size occurs, printing result is output immediately and the user is not required to wait for completion of another print job. In addition, print data corresponding to the images printed on the recording sheets of the substitute size is stored in the storage. Thus, without requiring a terminal device or the like to retransmit the print data to the image forming device, the images can be reprinted on the recording sheets of the designated size.

BRIEF DESCRIPTION OF THE ACCOMPANYING DRAWINGS

FIG. 2 shows a substitution table according to the embodiment.

DETAILED DESCRIPTION OF THE EMBODIMENT

Hereinafter, referring to the accompanying drawings, as an example of an image forming device according to the invention, a network printer 10 and its modifications will be described. The image forming device according to the invention need not be limited to the configuration of the embodiment and its modifications. That is, as long as a printer function is provide, the invention can be applied to any device including a multi function peripheral having a scanner function, a copier function, a printer function and a facsimile function, or a single-function copying machine.

Figure 1:
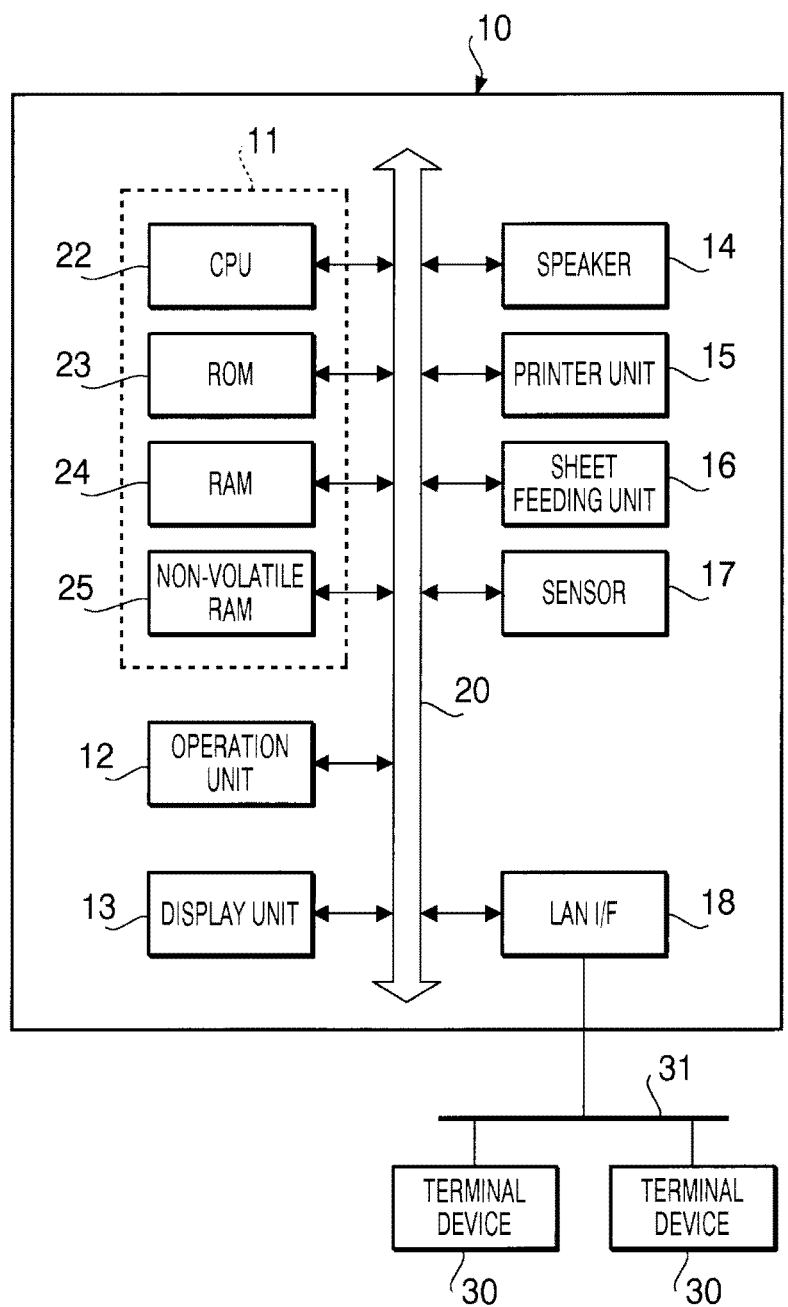
FIG. 1 is a block diagram showing a configuration of the network printer according to an embodiment of the invention.

FIG. 1 is a block diagram showing a configuration of the network printer 10.

As shown in FIG. 1, the network printer 10 is communicatably connected to two terminal devices (e.g., personal computers) 30 via a LAN (Local Area Network) 31. Although two terminal devices are shown in FIG. 1, the number of the terminal devices 30 need not be limited to two, but the number may be one or more than two.

The network printer 10 is a so-called page printer which prints out print data received from the terminal devices 30 on recording sheets on a page-by-page basis. The print data is data described in a Page Description Language (PDL). The print data contains sheet size information and layout information. The sheet size information is information representing a size of the recording sheets used in printing the print data. The network printer 10 prints the print data using recording sheets of the size indicated by the sheet size information. The layout information is information representing layout of print data. The layout information includes information whether the print data is to be printing on a one side of the recording sheet (i.e., single-side printing) or both sides of the recording sheet (i.e., double-side printing). Based on the layout information, the network printer 10 executes double-side printing or single-side printing.

A control unit 11 of the network printer 10 controls entire operation of the network printer 10. As shown in FIG. 1, the control unit 11 is configured as a micro computer including mainly a CPU (Central Processing Unit) 22, a ROM (Read Only Memory) 23, a RAM (Random Access Memory) 24 and a nonvolatile RAM (NVRAM) 25. The control unit 11 is communicatably connected to each of an operation unit 12, a display unit 13, a speaker 14, a printer unit 15, a sheet feed unit 16, a sheet sensor 17, a LAN I/F (Local Area Network Interface) 18 via a bus 20. Incidentally, the configuration of the network printer 10 is not limited to one shown in FIG. 1, but may be modified in various ways.

The CPU 22 controls each unit of the network printer 10 in accordance with a program stored in the ROM 23.

The RAM 24 serves as a main memory and a work area when the CPU 22 executes the program, and stores various data. Print data which is transmitted from the terminal device 30 is also temporarily stored in the RAM 24. The print data stored in the RAM 24 is converted into bitmap data for each page by the control unit 11. The data is printed on recording sheets of an designated size, which are selectively supplied from the sheet feeding unit 16, by the printer unit 15. As described in detail later, in the network printer 10, when the recording sheets of the designated size run out, the printing is executed using the recording sheets of a size different from the designated size.

The NVRAM 25 stores various setup data used in the network printer 10 to be retained even if it is powered off. The data to be stored in the NVRAM 25 includes a substitution table 35 (see FIG. 2), which is described later.

According to the embodiment, the print data transmitted from the terminal device 30 is temporarily stored in the RAM 24. Thereafter, when printing is executed using the recording sheets of a substitute size which is different from the designated size, part of the print data which is printed on the recording sheets of the substitute size is store in the NVRAM 25 and retained. On the other hand, part of the print data which is printed on the recording sheets of the designated size is not stored in the NVRAM 25. When the print data is stored in the NVRAM 25, the stored parts of the print data are related to respective print jobs.

The operation unit 12 is provided with an input key and a touch panel through which a user inputs information. The network printer 10 operates in accordance with information input through the operation unit 12. The network printer 10 also operates according to instructions transmitted from the terminal device 30a through a printer driver.

The operation unit 12 includes a "GO" button and a "CANCEL" button. As described later in detail, in the network printer 10, when running out of the recording sheets of the designated size occurs, printing is executed using recording sheets of a different size. In such a case, the print data is stored in the given area of the NVRAM 25 for reprinting, and for this purpose, the print data is not deleted after printing using the substitute size recording sheets is finished. The "GO" button and "CANCEL" button is used when the print data is stored for reprinting. The "GO" button is an input key for instructing reprint of the stored print data on the recording sheets of the designated size. The "CANCEL" button is an input key for instructing deletion of the stored print data.

Figure 14:
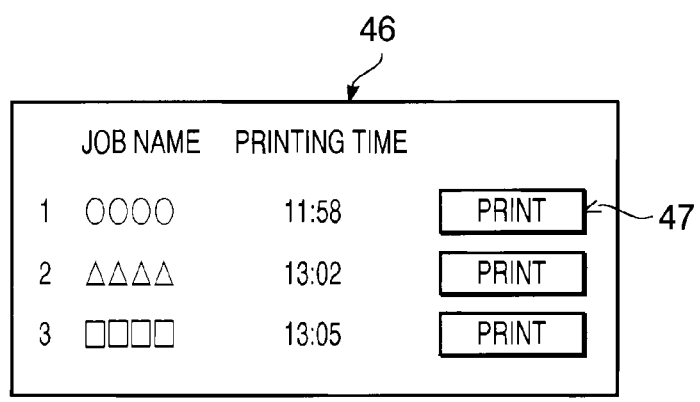
FIG. 14 shows an example of a message displayed on the display unit.

A touch panel is provided to the operation unit 12, and print keys 47 are displayed on a display screen 46 (see FIG. 14). The display screen 46 is displayed after elapsing a predetermined time (e.g., 3 minutes) since the printing is finished while the print data is stored. The print keys 47 are displayed for each print job listed on the display screen 46 as shown in FIG. 14. The input keys are for instructing reprint of the stored print data on recording sheets of the designated size. By depressing the print key 47 (i.e., by touching a corresponding portion of the touch panel), re-printing of print data of a print job which corresponds to the print key 47 is instructed.

The display unit 13 is provided with a liquid crystal display (LCD) panel and an LED lamp. The display unit 13 displays setup information and operation status of the network printer 10. The speaker 14 is provided to output a predetermined warning sound and/or a voice message.

The printer unit 15 is configured to print out the print data on page-by-page basis. The printing is executed using the recording sheets of the designated size, which are selectively supplied by the sheet feeding unit 16. In the embodiment, the printer unit 15 is a so-called laser printer which uses a semiconductor laser (LD: Laser Diode) as a light source to form a electrophotographic latent image on a surface of a photoconductor drum. The printer unit 15 forms an image represented by the print data using toner of four colors: cyan (C), magenta (M), yellow (Y) and black (K). Alternatively, the printer unit 15 may be an LED printer, or the like, as long as the printer is a page printer.

The printer unit 15 is capable of executing single-side printing and double-side printing. Further, in each of the single-side printing and double-side printing, the printer unit 15 is capable of executed collective printing (i.e., N-in-one printing) and magnification-varying printing. The single-side printing is a print process where print data subject to the single-side printing is printed on one surface of each recording sheets supplied by the sheet feeding unit 16. The double-sided printing is a print process where print data of multiple pages indicated to be double-sided printing is printed on both surfaces of each of the recording sheets supplied by the sheet feeding unit 16. The collective printing (i.e., N-in-one printing) is a print process where print data of multiple pages (i.e., N pages) is printed collectively on one surface of each of the recording sheets supplied by the sheet feeding unit 16. The collective printing is available both in single-side printing and double-side printing. The magnification-varying printing is a print process where print data is printed in an enlarged or reduced manner so as to meet a size of the recording sheets supplied by a sheet feeding unit 16.

The sheet feeding unit 16 supplies recording sheets to the printer unit 15. The sheet feeding unit 16 has a plurality of sheet supply cassettes (e.g., five cassettes, not shown). The cassettes (e.g., a first cassette, a second cassette, . . . , a fifth cassette) accommodate recording sheets of different sizes, respectively. For example, the first cassette accommodates A3 size sheets (JIS A3: 420 mm by 297 mm), the second cassette accommodates B4 size sheets (JIS B4: 364 mm by 257 mm), the third cassette accommodates A4 size sheets (JIS A4: 297 mm by 210 mm), the fourth cassette accommodates B5 size sheets (JIS B5: 257 mm by 182 mm), and the fifth cassette accommodates A5 size sheets (JIS A5: 210 mm by 148 mm), "JIS" being Japanese Industrial Standards. According to the embodiment, the size of sheets accommodated in each cassette is preliminarily determined, and information regarding the size of the sheets is stored in the NVRAM 25. It should be noted that, the number of the cassettes is not limited to 5, as long as it is more than one. In addition, sizes of the sheets accommodated in the cassettes may be different from the above configuration.

The control unit 11 determines the designated size based on the size information included in the print data, when the print data is transmitted from the terminal device 30. The control unit 11 controls the sheet feeding unit 16 to selectively supply the recording sheets of the designated size to the printer unit 15 based on the determination result. For example, if the designated size is determined to be the A4 size, the control unit 11 controls the sheet feeding unit 16 to supply the recording sheets to the printer unit 15 from the third cassette. If running out of the recording sheets of the designated size occurs during the printing operation, the control unit 11 controls the sheet feeding unit 16 to supply the recording sheets of a different size (substitute recording sheets) to the printer unit 15. The substitute recording sheets will be described in detail later.

Each sensor 17 detects running out of recording sheets at the sheet feeding unit 16. Specifically, one sensor 17 is installed in each of the first through fifth cassettes. Each sensor 17 outputs different sensor signals (electric signals) in a status where the recording sheets are accommodated (i.e., an available status) in the cassette and in a status where the recording sheets are not accommodated (i.e., an unavailable status) in the cassette. When the status changes from the available status to the unavailable status, the sensor signal output from the sensor 17 changes. Similarly, when the status changes from the unavailable status to the available status, the sensor signal also changes. Therefore, the control unit 11 can judge whether the recording sheets of each size is in the available status or the unavailable status based on the sensor signal output from each sensor 17. Accordingly, the control unit 11 can detect running out of the recording sheets and supplement of the recording sheets based on the sensor signals.

The LAN I/F 18 is an interface which communicatably connects the network printer 10 with the LAN 31. The print data generated by the terminal device 30 is transmitted to the network printer 10 via the LAN 31 and the LAN I/F 18. Alternatively, the network printer 10 may be connected with the terminal device 30 via a so-called printer port, instead of the LAN I/F 18.

FIG. 2 shows an example of the substitution table 35.

When the sensor 17 detects running out of the designated size sheets, the recording sheets of a different size are supplied as substitute recording sheets by the sheet feeding unit 16 to the printer unit 15. According to FIG. 2, the substitution table 35 specifies two sizes of the substitute recording sheets for each designated size, and the order of priority. As shown in FIG. 2, the substitute table 35 is configured with five records, each of which includes three fields of "designated size," "first substitute size" and "second substitute size." Information contained in each field is as follows. In the "designated size" field, the recording sheet size which is designated by the terminal device 30 (i.e., represented by the sheet size information) is indicated. In the "first substitute size" field, the size of the recording sheets to be used in case of the running out of the recording sheets of the "designated size" is indicated. In the "second substitute size" field, the size of the recording sheets to be used in case of running out of the recording sheets of the "first substitute size" is indicated. The "first substitute size" and the "second substitute size" have priorities in this order, and the "first substitute size" and "second substitute size" are related to the "designated size" in the same record (i.e., in the same row of the table).

When the running out of the recording sheets of the designated size occurs during the printing operation, the control unit 11 determines the size of substitute recording sheets referring to the substitute table 35. For example, when the sensor 17 detects running out of A4 size recording sheets, the control unit 11 determines the A3 size sheets as the substitute recording sheet. Accordingly, when the running out of the recording sheets occurs while printing the print data on the A4 size recording sheets, the control unit 11 controls the sheet feeding unit 16 to feed the A3 size recording sheets instead of the A4 size recording sheets. In addition, if the running out of the recording sheets of the "first substitute size" occurs during the printing operation is executed using the recording sheets of the "first substitute size," the control unit 11 determines, referring to the substitute table, that the B4 size recording sheets should be used as the second substitute recording sheets. Then, the B4 size recording sheets are supplied by the sheet feeding unit 16 to the printer unit 15 instead of A3 size recording sheets. Incidentally, each of the first substitute size and the second substitute size may be changed by the user through the operation unit 12.

As described above, each terminal device 30 is communicatably connected to the network printer 10. The print data transmitted from the terminal device 30 to the network printer 10 after generation the print data as described bellow.

The terminal device 30 generates image data composed of three color components: red (R), green (G) and blue (B) components, based on image forming instructions issued by the applications. The image data represents a multilevel color image which is expressed by 8-bit RGB color components (i.e., 256 step gradation image). The image data is generated for each page. The image data in the RGB format is converted into CMYK format image data which is composed of 4 color components: cyan (C), magenta (M), yellow (Y) and black (K). The multilevel CMYK format image data is then converted into binary image data in accordance with a well-known binarizing method such as the error diffusion method or dither method. The terminal device 30 generates print data by adding the sheet size information and layout information to the binary image data in the CMYK format. The terminal device 30 then transmits the thus generated print data to the network printer 10 with segmenting the data into pages.

Next, a single-side print process, which is executed in the network printer 10 when the print data for single-side printing is received from the terminal device 30, is described.

Figure 3:
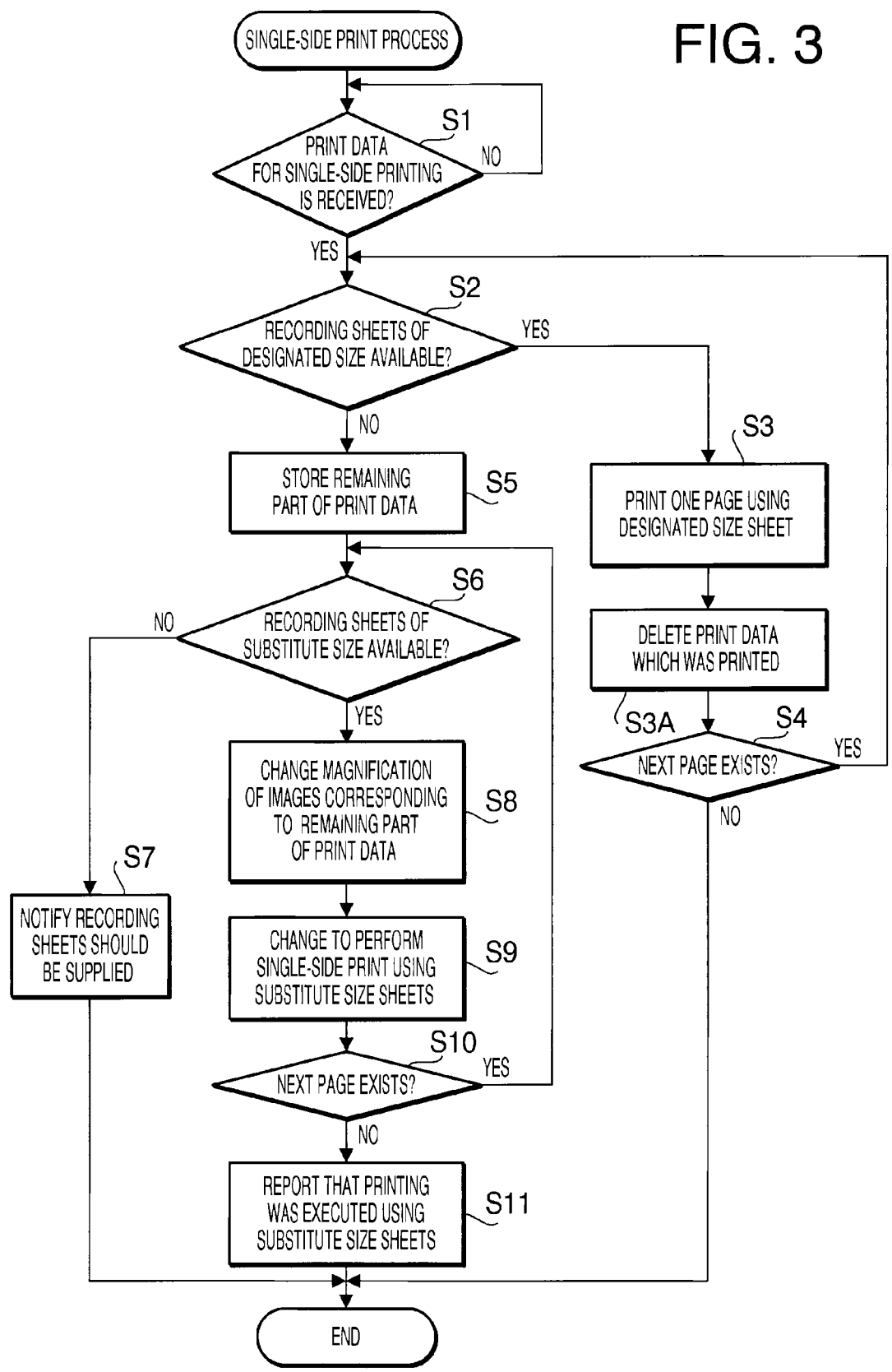
FIG. 3 is a flowchart illustrating a single-side print process executed in the network printer according to the embodiment.
Figure 4:
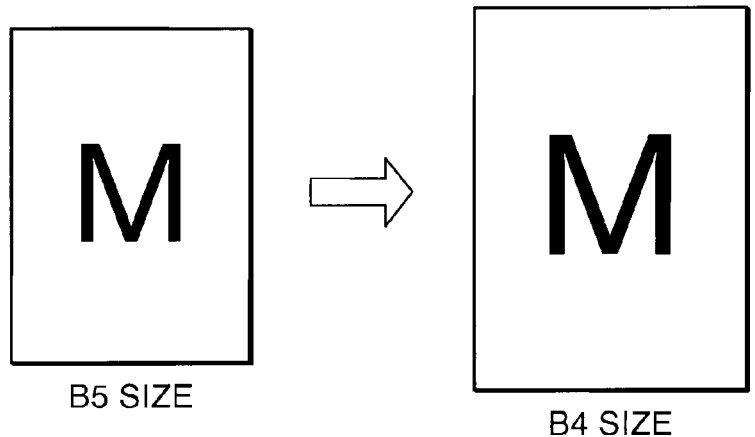
FIG. 4 shows a magnification change executed in the network printer according to the embodiment.
Figure 5:
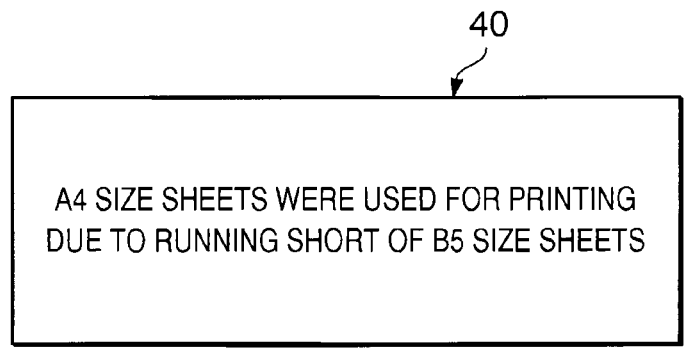
FIG. 5 shows an example of a message displayed on the display unit of the network printer.

FIG. 3 is a flowchart shows the single-side print process executed in the network printer 10 that receives print data for the single-side printing. FIG. 4 shows a magnification change executed in the network printer 10. FIG. 5 shows an example of a message window 40 displayed on the display unit 13 of the network printer 10. The processes of the network printer 10 described below is performed based on instructions issued by the control unit 11 as it executes the programs stored in the ROM 23.

The control unit 11 judges whether print data for single-side print is received (S1). The judgment is made based on the layout information contained in the received print data. If the control unit 11 determines that print data is data for single-side print (hereinafter, referred to as single-side print data) is not received (S1: NO), the process goes back to S1. If the control unit 11 determines that single-side print data is received (S1: YES), the control unit 11 temporarily stores the received print data in the RAM 24, and judges whether the recording sheets of the designated size are available (S2). In other words, the control unit 11 detects running out of the recording sheets of the designated size in the sheet feeding unit 16 with the sensor 17. It should be noted that the control unit 11 determines the designated size based on the sheet size information contained in the received print data. Then, the control unit 11 determines whether the recording sheets of the designated size are accommodated in the sheet feeding unit 16 based on the detection result of the sensor 17 corresponding to the cassette of the recording sheets of the designated size.

Depending on whether the recording sheets of the designated size are available or not, the control unit 11 converts the print data described in the page description language into bitmap data. Specifically, if the control unit 11 determines that the recording sheets of the designated size are available (S2: YES), the control unit 11 controls the printer unit 15 to print out one page of the print data on one surface of the recording sheet of the designated size (S3). Then, the control unit 11 deletes the print data corresponding to the printed page, which was printed out in S3, from the RAM 24 (S3A). Next, the control unit 11 judges whether there exits print data for the next page (S4). If the control unit 11 determines that there exists the print data for the next page (S4: YES), the process goes back to S2. If the control unit 11 determines that there does not exist the print data for the next page (S4: NO), the process is terminated.

If the control unit 11 determines that the recording sheets of the designated size are not available (S2: NO), the remaining part of print data (i.e., the print data for subsequent pages, which cannot be printed on respective surfaces of the recording sheets of the designated size), is stored in the NVRAM 25 with relation to sheet size information and layout information (S5). Then, the control unit 11 judges, referring to the substitute table 35, whether the recording sheets of the first substitute size are available based on the detection results of the sensors 17 (S6).

For example, when the designated size is the A4 size and the A4 recording sheets are unavailable, the control unit 11 retrieves the first substitute size (i.e., A3) and the second substitute size (i.e., B4) from the substitute table 35. Then, the control unit 11 judges whether the recording sheets of the substitute sizes (A3 size or B4 size, in this example) are accommodated in the sheet feeding unit 16 based on sensor signals from the sensors 17 corresponding to the A3 and B4 recording sheets. If either the recording sheets of the first substitute size or the recording sheets of the second substitute size are unavailable (i.e., not accommodated in the sheet feeding unit 16) (S6: NO), the process proceeds to S7. If at least the recording sheets of the first substitute size or the recording sheets of the second substitute size are available (i.e., accommodated in the sheet feeding unit 16) (S6: YES), the process proceeds to S8.

If the control unit 11 determines that the recording sheets of the substitute sizes are unavailable (S6: NO), the control unit 11 notifies the user that the recording sheets should be supplied (S7). For example, the control unit 11 controls the display unit 13 to display a message such as "Please supply recording sheets." It should be noted that S7 may not be limited to a step of displaying the message. Optionally or alternatively, S7 may include, for example, a step of beeping an alarm from the speaker 14.

If the control unit 11 determines that the recording sheets of the substitute size(s) are available (S6: YES), the control unit 11 processes the print data, which have not been printed on the recording sheets of the designated size and stored in the in the NVRAM 25, such that an image for each page represented by the print data is magnified/reduced to meet the substitute size (S8). Since the print data is used for reprinting, bitmap data that is created from the print data is processed to magnify/reduce the image represented by the print data. It should be noted that the first substitute size has a higher priority to the second substitute size. Therefore, if either the recording sheets of the first substitute size and the second substitute size are available, the recording sheets of the first substitute size will be used.

For example, when the designated size is the B5 size (257 mm×182 mm) and the substitute size is the A4 size (297 mm×210 mm), the control unit 11 magnifies the bitmap data converted from the print data such that the image represented by the processed bitmap data is enlarged by 115% (see FIG. 4). That is, the image represented by the print data is changed according to the designated size and the substitute size. It should be noted that when the substitute size is smaller than the designated size, the image represented by the print data is reduced (i.e., the bitmap data is processed so that the image represented thereby is reduced). Incidentally, the magnifying/reducing process is applied to the bitmap data but not to the print data. The print data stored in the NVRAM 25 (in S5) is not processed and remained as it is. With the above data processing, the control unit 11 controls the printer unit 15 to print the image of one page, in a magnified or reduced manner, on one side of the recording sheets of the substitute size (S9). For example, regarding the above example, the control unit 11 controls the sheet feeding unit 16 to supply A4 recording sheets to the printer unit 15. Then, the control unit 11 controls the printer unit 15 to execute printing by processing the bitmap data, which is created based on the print data, such that the image represented by the bitmap data is magnified/reduced in S8. Thus, the control unit 11 controls the sheet feeding unit 16 to supply recording sheets of the substitute size if the sensor 17 detects running out of the recording sheets of the designated size. Then, the control unit 11 generates the bitmap data based on the remaining part of the print data which has not been printed out on the recording sheets of the designated size and processes the bitmap data to magnify/reduce the image represented thereby so as to meet the substitute size. Then, the control unit 11 prints out the magnified or reduced image on one surface of the recording sheet based on the processed bitmap data.

It should be noted that S8 is an optional step, and is not necessarily be executed. If a good result for visual recognition to a user is expected by magnifying or reducing the image printed on the recording sheets of the substitute size, it is desirable to process the bitmap data to change the size of the image to meet the substitute size.

The control unit 11 judges whether there exists print data for a next page after execution of S9 (S10). If the control unit 11 determines that there exists print data for the next page (S10: YES), the process goes back to S6. If the control unit 11 determines that there does not exist print data for the next page (S10: NO), the control unit 11 notifies that the printer unit 15 executes printing using the recording sheets of the substitute size (S11). For example, the control unit 11 controls the display unit 13 to display a message such as "Since the B5 recording sheets are unavailable, printing is executed using A4 recording sheets." as shown in FIG. 5 on the display screen 40. Alternatively or optionally, the reporting may include, for example, beeping an alarm or outputting a voice message from the speaker 14.

As described above, when running out of the recording sheets of the designated size occurs while the single-side print is executed, the printing operation is continued with the images being printed on the recording sheets of the substitute size in a magnified or reduced manner depending on the relationship between the designated size and the substitute size. Since the print job is kept executed, the user is not required to wait for completion of another print job as in the conventional printing system.

In addition, the single-side print data which is printed on the recording sheets of a substitute size is stored in the NVRAM 25. Thus, reprinting of the print data using the recording sheets of the designated size can be done immediately without re-transmitting the print data from the terminal device 30. The reprinting of the print data stored in the NVRAM 25 will be described in detail later.

Next, a modification of the single-side print process executed in the network printer 10 will be described.

Figure 6:
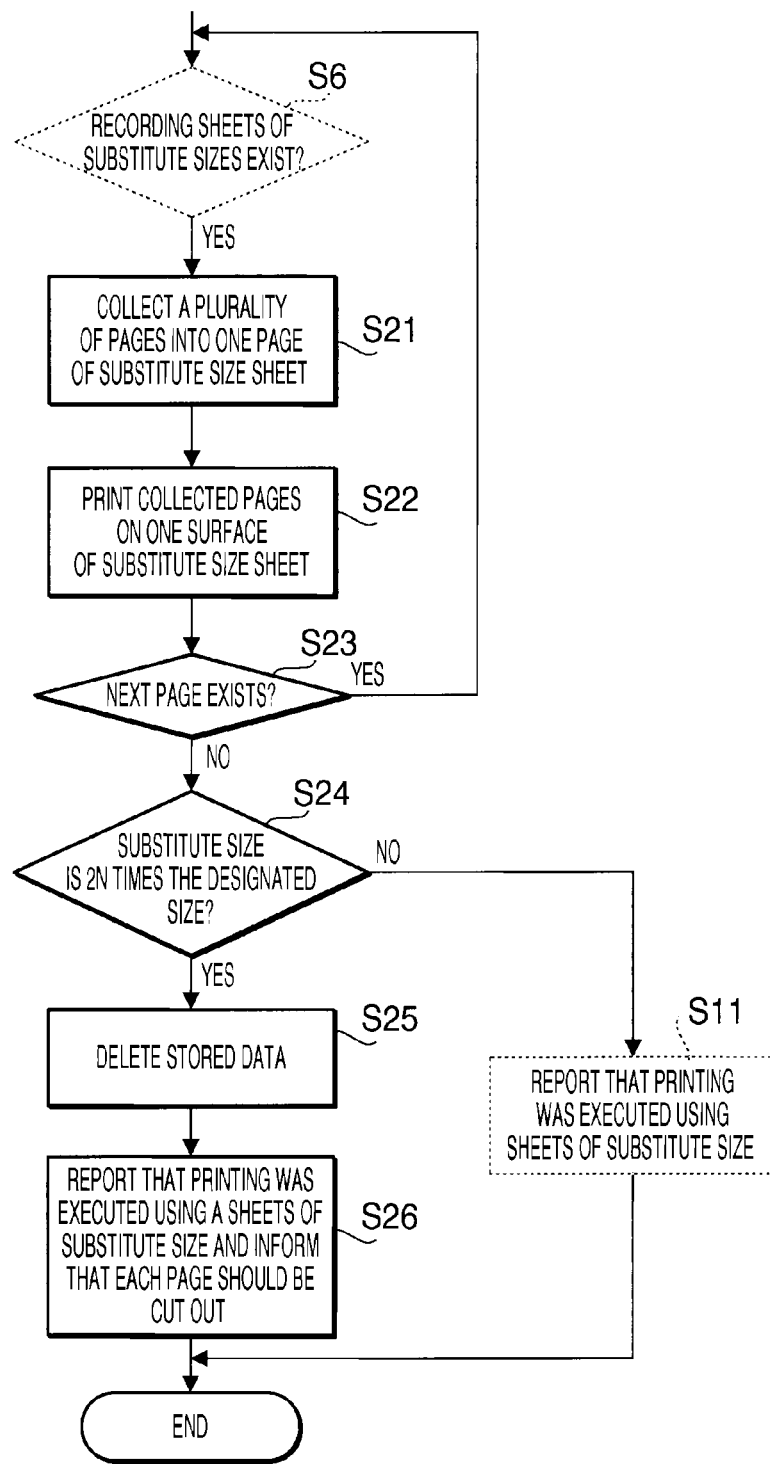
FIG. 6 shows a part of a flowchart illustrating a single-side print process according to a modification of the embodiment.
Figure 7A:
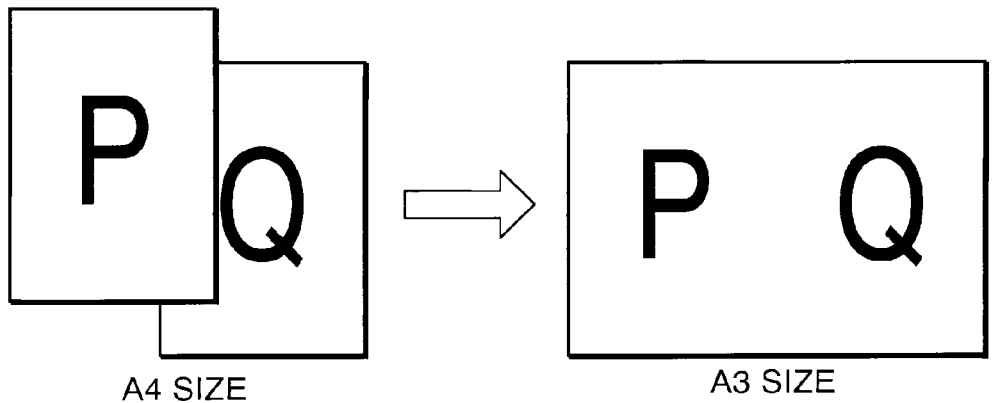
FIGS. 7A-7C show examples of collective printing for printing a plurality of pages in one recording sheet.
Figure 7B:
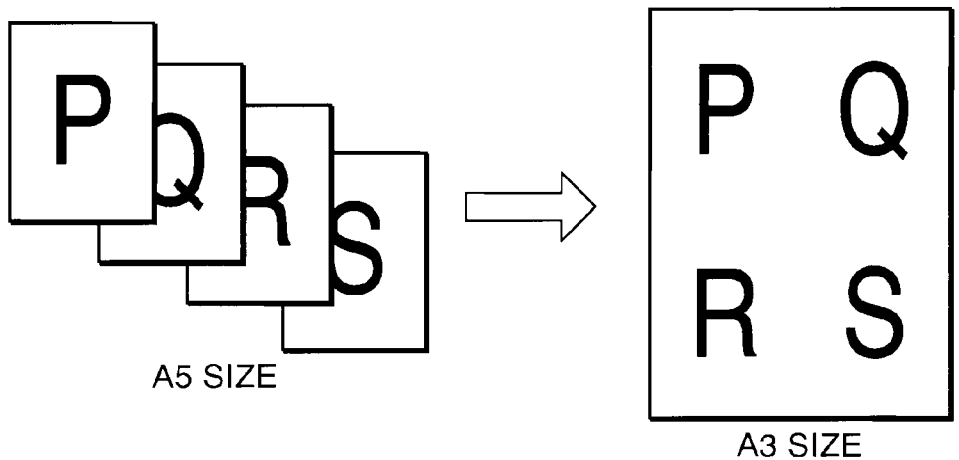
Figure 7C:
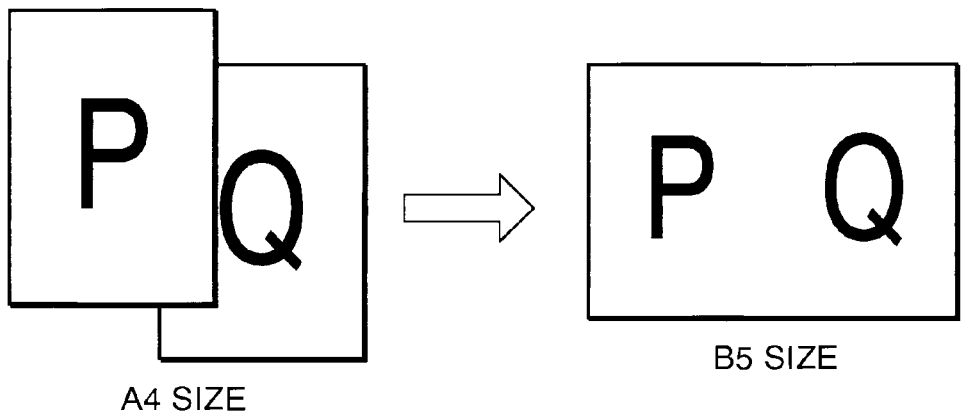
Figure 8:
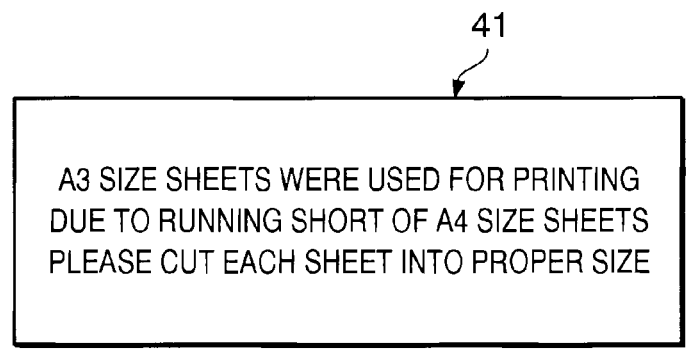
FIG. 8 shows an example of a message displayed on the display unit.

FIG. 6 is a flowchart showing part of a modified single-side print process executed in the network printer 10. FIGS. 7A-7C show examples of collective printing according to the modification of the single-side print process. FIG. 8 is an example of a message screen 41 displayed on the display unit 13. It should be noted that the modified single-side print process includes steps similar to those in the single-side print processes shown in FIG. 3. Therefore, in FIG. 6, the steps similar to those shown in FIG. 3 are omitted and only different steps will be described below referring to FIG. 6.

As shown in FIG. 6, if the control unit 11 determines that there exist the recording sheets of the substitute size (S6: YES), the control unit 11 collects a plurality of pages into one page of the substitute size sheet (S21). For example, when the designated size is the A4 size and the substitute size is the A3 size, as shown in FIG. 7A, the control unit 11 collects two pages of A4 size images into an image of one page of the A3 size recording sheet. If the designated size is the A5 size and the substitute size is the A3 size, as shown in FIG. 7B, the control unit 11 collects four pages of image for A5 size recording sheets into an image of one page of the A3 size recording sheet. Thus, print data of a plurality of pages is collected into an image of one page of the recording sheet of the substitute size. It should be noted that step S21 is executed by processing the bitmap data which is converted form the print data. In the example shown in FIG. 7A, the substitute size (A3 size) is double of the designated size (A4 size), and in the example shown in FIG. 7B, the substitute size (A3 size) is four times the designated size (A5 size). Therefore, the images are collected without magnification/reduction thereof.

If the substitute size is not 2N times the designated size (N being a natural number), magnified/reduced images for N pages of the designated size are collected into an image of one page of the substitute size. For example, when the designated size is the A4 size and the substitute size is the B4 size, as shown in FIG. 7C, the control unit 11 collects images of two pages of A4 size recording sheets into an image of one page of the B4 size recording sheet. In this case, the substitute size (B4 size) is 1.22 times the designated size (A4 size). Therefore, the image size represented by the print data is changed (in this example, reduced) and images for two pages of the designated size (B4 size) are collected into one page of image of the substitute size (A4 size). According to the modified embodiment, the nonvolatile RAM 25 stores arrangement information on layout arrangement when the a plurality of pages of images are collected into an image for one page. The arrangement information is set based on a relationship among the designated size and the substitute size. In S21, images for multiple pages are arranged in an image for one page based on the arrangement information.

The control unit 11 controls the printer unit to print one page of image in which multiple images are collected in S21 using recording sheets of the substitute size (e.g., A3 size) different from the designated size (e.g., A4 size) (S22). As described above, the control unit 11 controls the sheet feeding unit 16 to supply the recording sheets of the substitute size if the sensor 17 detects running out of the recording sheets of the designated size. Then, the control unit 11 controls the printer unit 15 to execute the N-in-one printing of the print data, using the recording sheet of the substitute size.

The control unit 11 determines whether there exits the print data for a next page (S23). If the control unit 11 determines that there exists the print data for the next page (S23: YES), steps S6 onwards are executed to the print data for the next page (and subsequent pages). If the control unit 11 determines that there does not exist the print data for a next page (S23: NO), the control unit 11 determines whether the substitute size is 2N (N being a positive integer) times the designated size (S24). Examples of cases where the substitute size is 2N times the designated size are: a case where the designated size is the A4 size and the substitute size is the A3 size (see FIG. 7A), and a case where the designated size is the A5 size and the substitute size is the A3 size (see FIG. 7B).

If the control unit 11 determines that the substitute size is not 2N times the designated size (S24: NO), the process executes S11. As an example of the substitute size, which is not 2N times the designated size, there is a case that the designated size is the A4 size and the substitute size is the B4 size (see FIG. 7C).

If the control unit 11 determines that the substitute size is 2N times the designated size (S24: YES), the control unit 11 deletes the print data stored in the NVRAM 25 (S25). Then, the control unit 11 notifies the user that the printer unit 15 executes printing using the recording sheets of the substitute size and that the recording sheets should be cut (S26). For example, the control unit 11 controls the display unit 13 to display such as "Since the A4 size recording sheets are unavailable, printing was executed using A3 size recording sheets." and "Please cut the recording sheets into A4 size." on the message screen 41 as shown in FIG. 8. Optionally or alternatively, the notification may include, for example, beeping an alarm or outputting a voice message from the speaker 14.

Thus, according to the modified single-side print process, when running out of the recording sheets of the designated size occurs, so-called collective print (i.e., N-in-one print) is executed using recording sheets of the substitute size. Therefore, for example in a case where printing is executed using the recording sheets of the substitute size, which is larger than the designated size, waste of recording sheets by using only a half area of each recording sheet is used for printing can be effectively avoided. In addition, when the substitute size is 2N times the designated size, 2-in-1 printing as shown in FIG. 7A or 4-in-1 printing as shown in FIG. 7B is executed. In these cases, the user can obtain the same printing result since the designated size of pages can be obtained by cutting each page of the recording sheets of the substitute size into pages of the designates sizes. That is, when the substitute size is 2N times the designated size, exactly the same results as the user of the terminal device 30 designated can be obtained by cutting the recording sheets into pieces having the designated size. In such a case, because it is not necessary to save the print data for reprinting, the print data stored in the NVRAM 25 is deleted. Alternatively, the control unit 11 may retain the print data in the NVRAM 25 for reprinting the print data using the recording sheets of the designated size.

Next, a double-side print process executed in the network printer 10 will be described.

Figure 9:
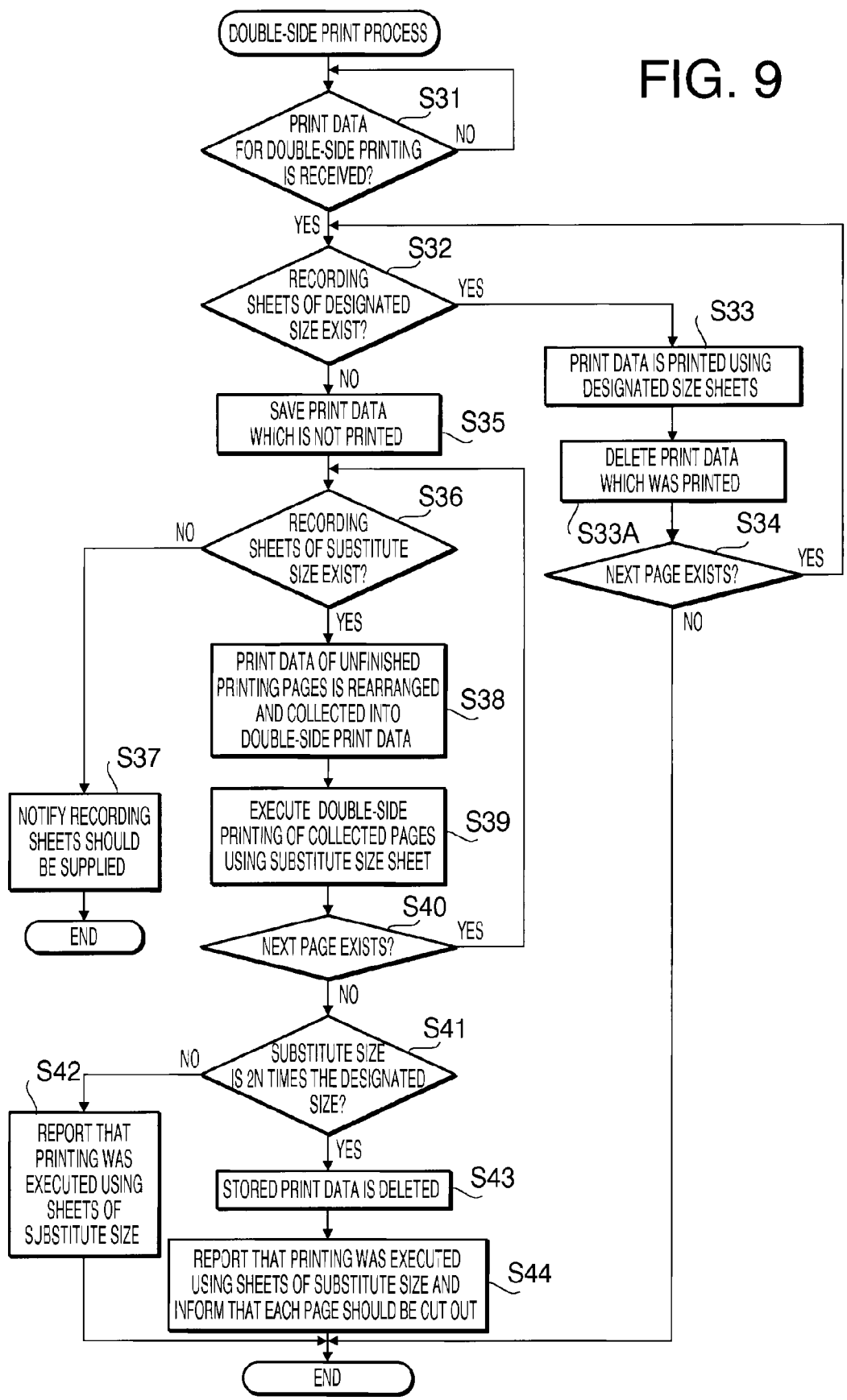
FIG. 9 is a flowchart illustrating a double-side print process executed in the network printer according to the embodiment.
Figure 10:
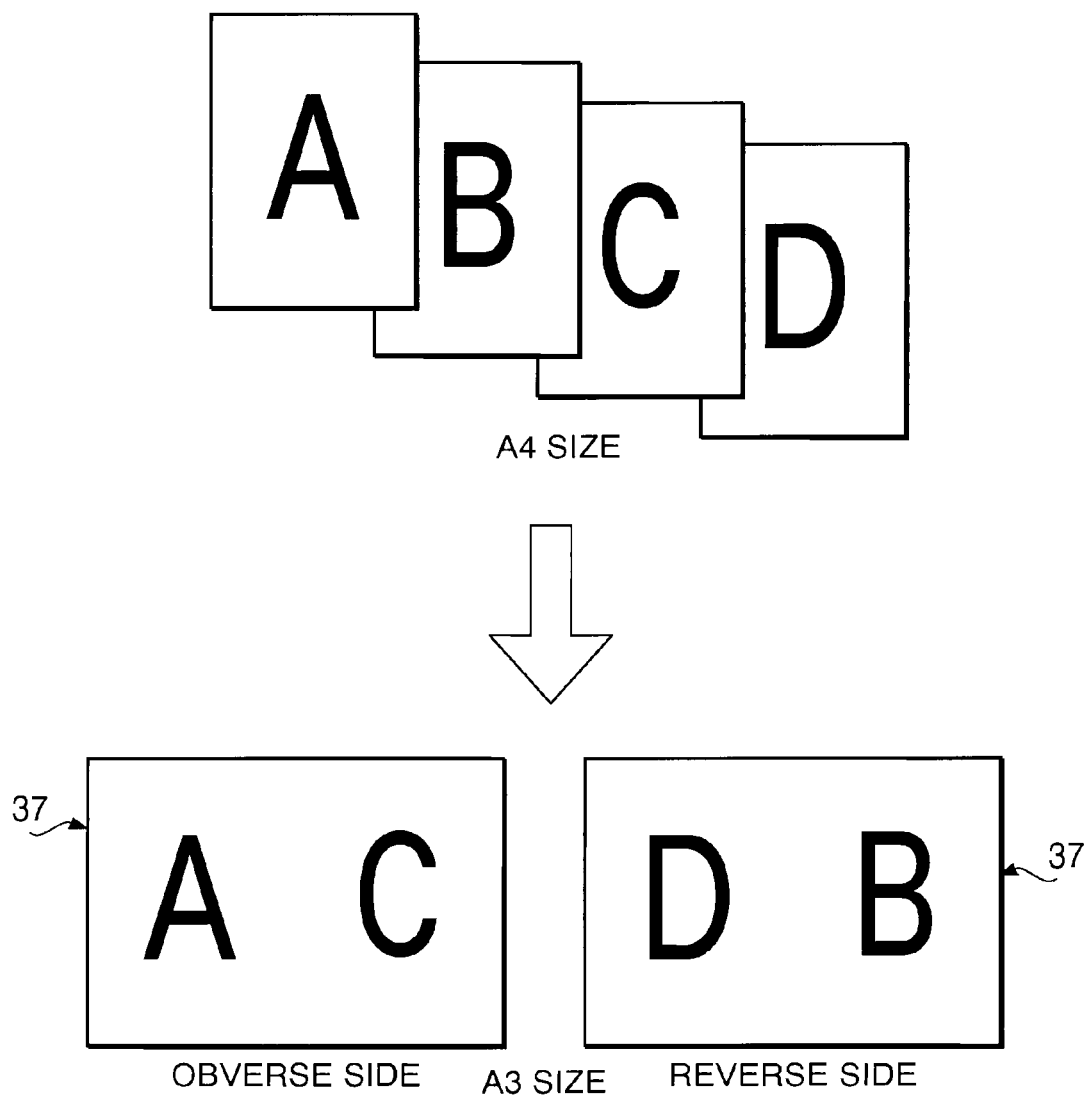
FIG. 10 shows an example of a combination of corrective printing and double-side printing.

FIG. 9 is a flowchart illustrating the double-side print process executed in the network printer 10. The double-side print process is executed. FIG. 10 shows a collective print process in which the N-in-one printing is executed on both sides of the recording sheet. It should be noted that arrows 37 in FIG. 10 indicate a left-hand side edge of a front surface of a recording sheet.

When the double-side print process is started, the control unit 11 judges whether print data for the double-side printing is received (S31). It should be noted that the double-side print process is similar to the modification of the single-side print process except that the images are printed on both sides of the recording sheets, and the collective print is also performed on both sides of the recording sheet. The judgment is made based on the layout information contained in the received print data. If the control unit 11 determines that print data for the double-side printing is not received (S31: NO), the process goes back to S31. If the control unit 11 determines that print data for the double-side printing is received (S31: YES), the control unit 11 stores the print data in the RAM 24, and judges whether the recording sheets of the designated size are available (S32). The control unit 11 detects running out of the recording sheets of the designated size based on the output signal of the sensor 17. The control unit 11 also converts the print data described in the page description language into bitmap data.

If the control unit 11 determines that recording sheets of the designated size are available (S32: YES), the control unit 11 controls the printer unit 15 to print the print data for two pages on front and back surfaces of the recording sheet of the designated size (S33). Then, the control unit 11 deletes the print data, which was printed in S33, in the RAM 24 (S33A) and judges whether there exits print data for a next page (S34). If the control unit 11 determines that there exists print data of the next page (S34: YES), the process goes back to S32. If the control unit 11 determines that there does not exist print data of a next page (S34: NO), the process is terminated.

If the control unit 11 determines that there exist no recording sheets of the designated size (S32: NO), print data for pages which will not be printed on the recording sheets of the designated size is stored in the NVRAM 25 with relation to sheet size information and layout information (S35). Then, the control unit 11 determines whether there exist recording sheets of the substitute size in the same way as in S6 of FIG. 3 or 6 (S36). If the control unit 11 determines that recording sheets of the substitute size do not exist (S36: NO), the control unit 11 notifies the user to supply the recording sheets in the same way as in the S7 (see FIG. 3) (S37).

If the control unit 11 determines that the recording sheets of the substitute size are available (S36: YES), the control unit 11 re-arranges the print data for a plurality of pages which are to be printed such that the plurality of pages are printed on each of the front and back surfaces of the recording sheet (S38). For example, as shown in FIG. 10, the control unit 11 collects images of four pages of A4 size recording sheet into the front side and back side of one of the recording sheet of the A3 size. The control unit 11 locates the first page and third page of succeeding 4 pages onto the front side of the A3 size recording sheet, and fourth page and the second page onto the back side of the A3 size recording sheet as shown in FIG. 10. Thus, the control unit 11 allocates the plurality of pages so that two consecutive pages are on the front surface and back surface of the same portion of the recording sheet. With this arrangement, after cutting the recording sheet into each of the plurality of page collected on one surface of the recording sheet, the consecutive pages are arranged on the front and back surfaces of the same recording sheet. It should be noted that, when the collective print is performed, the plurality of pages are re-arranged based on the layout information stored in the nonvolatile RAM 25. Further, the collective print process of S38 is executed by processing the bitmap data.

The control unit 11 controls the printer unit 15 to print the images of two pages containing images of four pages on the front and back surfaces of the recording sheet of the substitute size (S39). As described above, the control unit 11 controls the sheet feeding unit 16 to supply the recording sheets of the substitute size to the printer unit 15 if the sensor 17 detects running out of the recording sheets of the designated size. Then, the control unit 11 collects the images for the plurality of pages which have not yet been printed, and controls the printer unit 15 to print the collected images by the collective printing operation.

Next, the control unit 11 determines whether there exits print data for a next page (S40). If the control unit 11 determines that there exists print data for the next page (S40: YES), the process goes back to S36. If the control unit 11 determines that there does not exist print data for the next page (S40: NO), the control unit 11 judges whether the substitute size is 2N times the designated size (S41). If the control unit 11 determines that the substitute size is not 2N times the designated size (S41: NO), the control unit 11 notifies the user that printing was executed using recording sheets of the substitute size as is done in S11 (S42). If the control unit 11 determines that the substitute size is 2N times the designated size (S41: YES), the control unit 11 deletes the print data stored in the NVRAM 25 (S43). Then, the control unit 11 notifies the user that the printer unit 15 executes printing using recording sheets of the substitute size and inform that the recording sheets should be cut into pieces having the designate size as in S26 (S44).

Thus, when running out of the recording sheets of the designated size occurs when double-side printing is execute, images of a plurality of pages are collected in one page of the recording sheets of the substitute size. Since the print job is continued, it is effectively avoided that the user has to wait for completion of another print job as in the case of the single-side printing. In addition, the print data which is printed on the recording sheets of the substitute size is stored in the NVRAM 25. Thus, it is possible to execute re-printing of the print data which is printed using the recording sheets of the substitute size without retransmission of the print data from the terminal device 30. Reprinting of the print data stored in the NVRAM 25 will be described in detail later.

As shown in FIG. 10, when steps S38 and S39 are executed, one sheet of the A3 size recording sheet onto which 4 pages of images (two on front surface, and the other two on back surface) may be cut into two sheets, each sheet bears images of consecutive pages. That is, an image "A" for the first page and an image "B" for the second page are printed on the front surface and its back surface, respectively, and an image "C" for the third page and an image "D" for the fourth page are printed on the front surface and back surface, respectively (see FIG. 10). Therefore, the user obtains a same printing result as obtained in a case where there is no running out of sheets, by cutting the recording sheets into multiple pages. In such a case, since it is not necessary to save the print data for reprinting, the print data stored in the NVRAM 25 is deleted by the control unit 11.

Furthermore, in the above case, the collective printing is executed on both surfaces of each recording sheet. However, double-side printing need not be associated with the collective printing. That is, if the running out of the recording sheets is detected while the double-side printing is performed, the double-sided printing may be executed using the recording sheets of the substitute size without collecting a plurality of pages on one surface of the recording sheet. That is, an image of a single page of the designated size may be printed on one surface of the recording sheet of the substitute size. In such a case, it is desirable that the image may be enlarged or reduced to meet the page of the recording sheet of the substitute size as is done in S8.

Next, a process executed in the network printer 10 is explained when double-sided printing or single-sided printing is finished.

Figure 11:
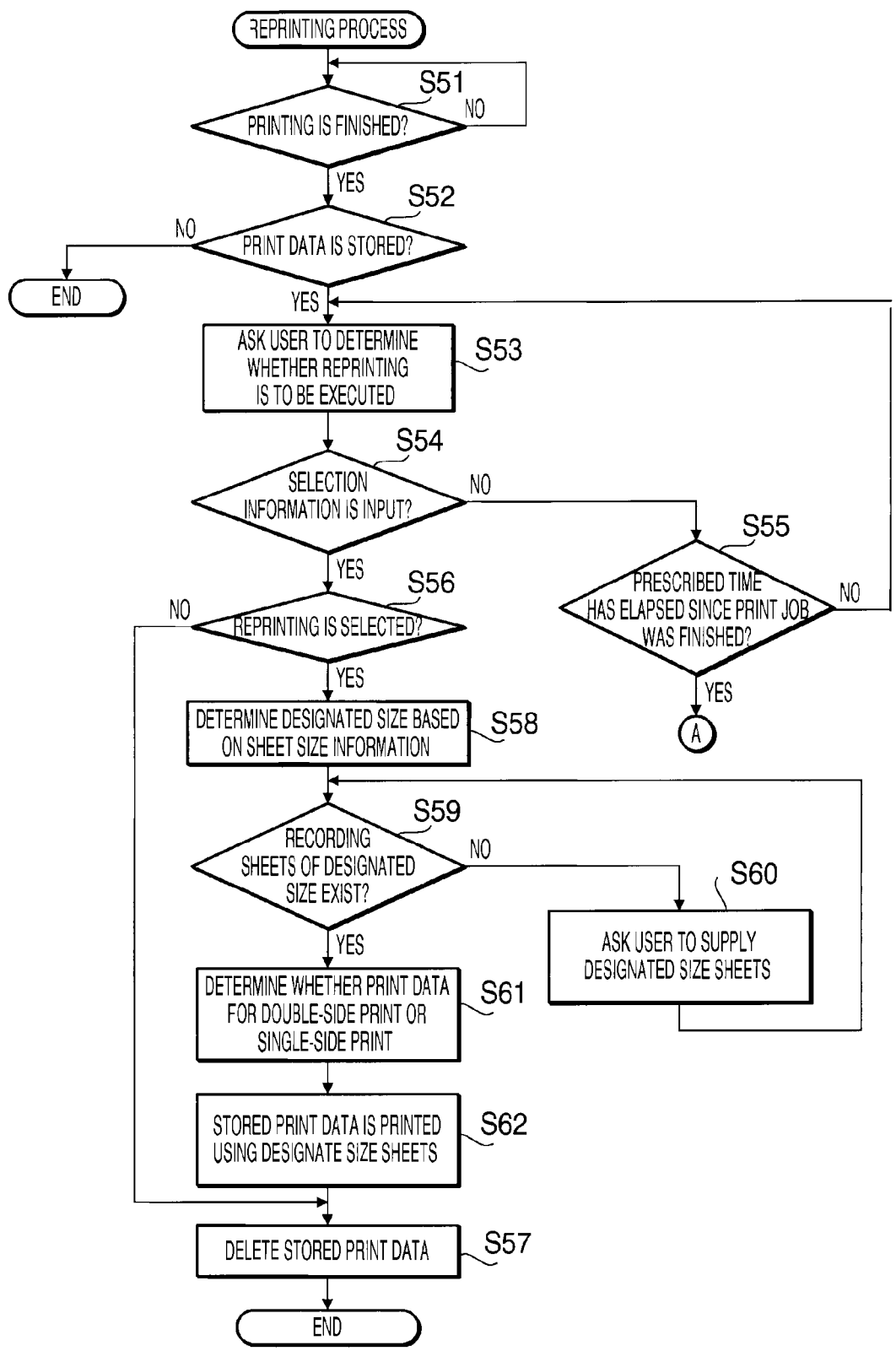
FIGS. 11 and 12 show a flowchart illustrating a post-print process executed in the network printer when printing is completed.
Figure 12:
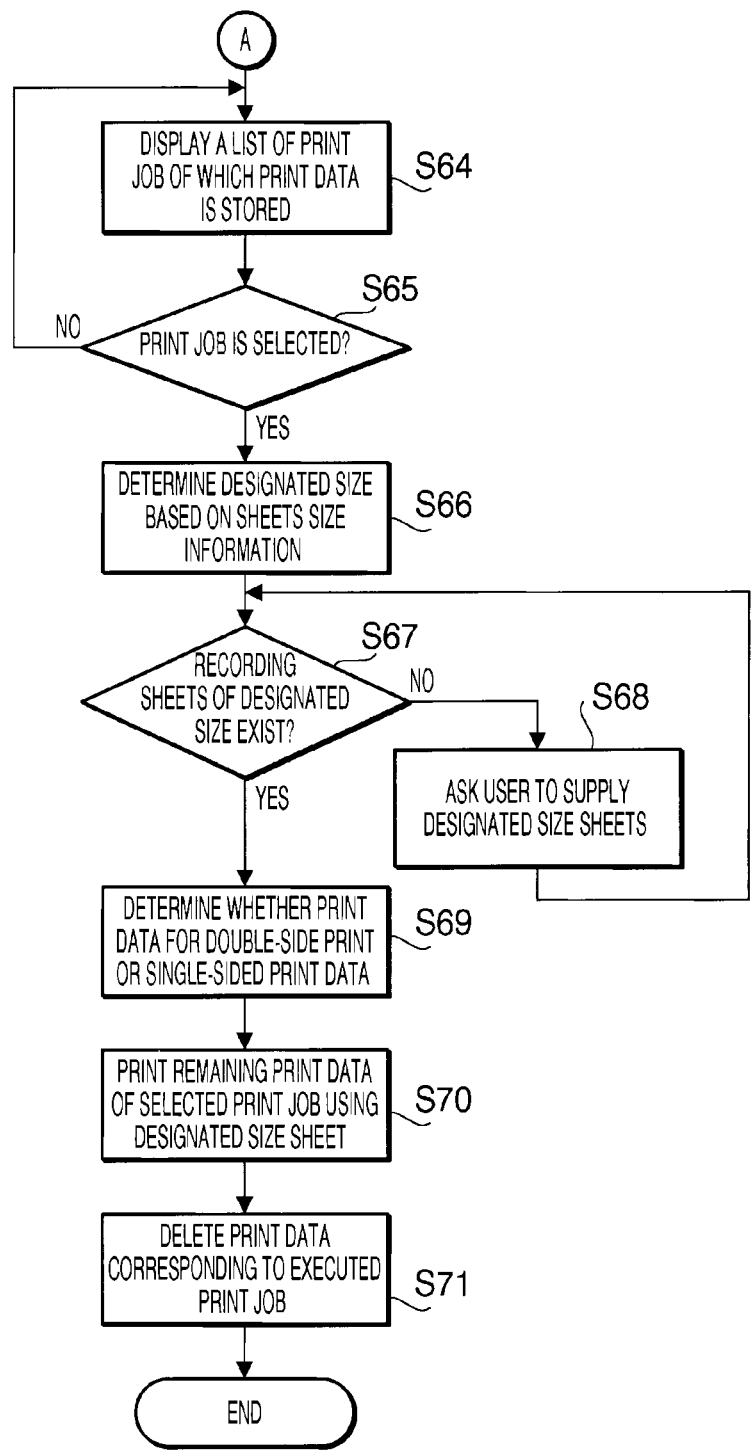
Figure 13A:
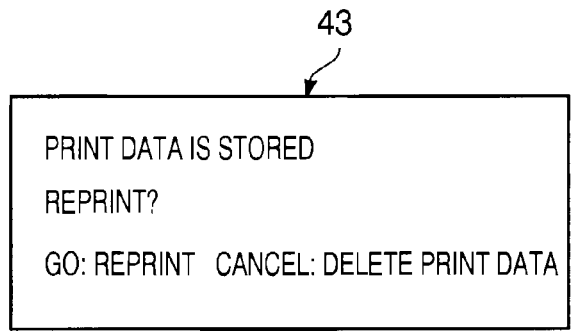
FIGS. 13A and 13B shows exemplary messages displayed on the display unit.
Figure 13B:
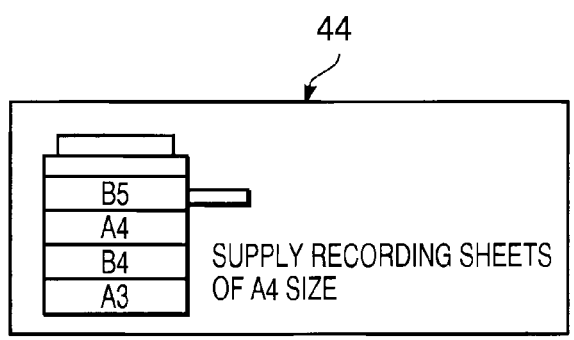

FIGS. 11 and 12 show a flowchart illustrating a post-print process executed in the network printer 10 when printing is finished. FIGS. 13A, 13B and 14 show examples of message screens 43, 44 and 46 displayed on the display unit 13.

As shown in FIG. 11, the control unit 11 judges whether the print job (i.e., double-side printing or single-side printing) is completed (S51). If the control unit 11 determines that the print job is not completed (S51: NO), the process goes back to S51. If the control unit 11 determines that the printing is completed (S51: YES), the control unit 11 judges whether the print data is stored in the NVRAM 25 (S52). If the control unit 11 determines that the print data is not stored (S52: NO), the process is terminated.

If the control unit 11 determines that the print data is stored (S52: YES), the control unit 11 asks the user to determine whether reprinting is to be executed or not (S52). For example, the control unit 11 controls the display unit 13 to display a message such as "Print data is stored. Do you want to reprint?" as shown in FIG. 13A in a message screen 43 displayed on the display unit 13. Then, the control unit 11 judges whether selection information is input from the operation unit 12 (S54). If the control unit 11 determines that selection information is not input (S54: NO), the control unit 11 judges whether a prescribed time period (e.g., 3 minutes) has elapsed since the print job was finished (S55). If the control unit 11 determines that prescribed time period has not elapsed (S55: NO), the process returns to S53.

If the control unit 11 determines that selection information is input (S54: YES), the control unit 11 judges whether reprint is selected (S56). Specifically, the control unit 11 determines whether a "GO" button for instructing re-printing is depressed or a "CANCEL" button for instructing deletion of the print data based on the operation input from the operation unit 12. Thus, the control unit 11 receives the selection information representing whether re-printing is executed if the print data is determined to be stored. If the control unit 11 determines that re-printing is not selected (S56: NO), that is, if the "CANCEL" button is depressed, the print data stored in the NVRAM 25 is deleted (S57). Thus, the control unit 11 deletes the print data stored in the NVRAM 25 if the control unit 11 determines that re-printing is not be executed.

If the control unit 11 determines that re-printing is selected (S56: YES), the control unit 11 determines a designated size based on sheet size information corresponding to print data stored in the NVRAM 25 (S58). Then, the control unit 11 determines whether the recording sheets of the designated size are available in the sheet feeding unit 16 based on detection results of the sensors 17 (S59). If the control unit 11 determines that the recording sheets of the designated size are unavailable (S59: NO), the control unit 11 notifies the user to ask the user to supply the recording sheets of the designated size (S60). For example, the control unit 11 controls the display unit 13 to display a message such as "Please supply A4 size recording sheets." as shown in FIG. 13B on the message screen 44 displayed on the display unit 13. Thus, the display unit 13 ask the user to supply the recording sheets of the designated size if a selection to execute re-printing is received. The step S60 is repeatedly executed until determination made in S59 is changed from "NO" to "YES."

If the control unit 11 determines that the recording sheets of the designated size are available (S59: YES), the control unit 11 judges whether the print data stored in the NVRAM 25 is print data for double-side print or single-side print (S61). The determination is made based on the layout information included in the print data stored in the NVRAM 25. The control unit 11 controls the printer unit 15 to print the print data stored in the NVRAM 25 on the recording sheets of the designated size (S62). If the print data is determined to be the data for the double-side print in S61, the double-side printing is executed using the recording sheets of the designated size by the printer unit 15 in S62. If the print data is determined to be the data for the single-side in S61, the single-side printing is executed using the recording sheets of the designated size by the printer unit 15 in S62. That is, if the control unit 11 determines that the NVRAM 25 stores print data and the sensor 17 detects presence of the recording sheets of the designated size, the recording sheets of the designated size are fed from the sheet feeding unit 16. Then, the control unit 11 controls the printer unit 15 to execute printing of the print data stored in the NVRAM 25. After executing the process of Step S62, the process goes to Step S57.

If the control unit 11 determines that prescribed time has elapsed since printing was completed (S55: YES), as shown in FIG. 12, the control unit 11 controls the display unit 13 to display a list of print jobs of which print data is stored (S64). For example, as shown in FIG. 14, the control unit 11 controls the display unit 13 to display the list of print jobs arranged in order of time when each print job was instructed in the print job screen 46 on the display unit 13. According to this example, in the display screen 46, print keys 47 are displayed. The print keys 47 are an input keys of the operation unit 12 to instruct printing of print data stored in the NVRAM 25 which is corresponding to the print job. The control unit 11 judges whether one of the listed print job is selected based on which one of the print keys 47 displayed on the display screen 46 is touched (S65). Thus, the operation unit 12 receives a selection of one of print jobs in the displayed list. If the control unit 11 determines that none of the print jobs are selected (S65: NO), step S64 is repeatedly executed. If the control unit 11 determines that one of the print jobs is selected (S65: YES), the control unit 11 determines the designated size based on sheet size information corresponding to the print data of the selected print job (S66). Then, the control unit 11 judges whether the recording sheets of the designated size are accommodated in the sheet feeding unit 16 (S67). If the control unit 11 determines that the recording sheets of the designated size are unavailable (S67: NO), the controls unit 11 notifies the user that recording sheets of the designated size should be supplied (S68). Specifically, the control unit 11 controls the display unit 13 to display a message such as "Please supply A4 size recording sheets" as shown in FIG. 13B. Until the recording sheets of the designated size are supplied (S67: YES), the process repeatedly executes S68.

If the control unit 11 determines that the recording sheets of the designated size are available (S67: YES), the control unit 11 judges whether the print data stored in the NVRAM 25 is print data for the double-side printing (S69). The determination is made based on the layout information corresponding to the print data. The control unit 11 controls the printer unit 15 to print the print data of the selected print job using the recording sheets of the designated size (S70). Further, if the print data is for the double-side print data, the double-side printing is executed by the printer unit 15 in S70. If the print data is the single-side print data, the single-side printing is executed by the printer unit 15 in S62. In Step S70, the control unit 11 controls the sheet feeding unit 16 to feed the recording sheets of the designated size corresponding to the print job selected with the operation unit 12 to the printer unit 15. Then, the control unit 11 controls the printer unit 15 to print the print data stored in the NVRAM 25 corresponding to the print job. After completion of the selected print job, the control unit 11 deletes the print data corresponding to the print job which has been executed by the printer unit 15 from the NVRAM 25 (S71).

Thus, when the user instructs the re-printing with the operation unit 12, the user is notified such that the recording sheets of the designated size should be supplied. Therefore, the user can easily obtain printing results that are output on the recording sheets of the designated size without instructing re-printing with the terminal device 30 by supplying the recording sheets of the designated size on receiving the report.

When the prescribed time has elapsed since the printing is completed while the NVRAM 25 stores the print data, the display screen is displayed by the display unit 13. The user can obtain printing results output recording sheets of the designated size by depressing the print key 47 corresponding to print job indicated by the user himself. Therefore, it is possible to avoid a problem where print data cannot be printed until print data corresponding to preceding print job is printed. In addition, since the print data which is not necessary to be stored is deleted from the store unit, a memory waste of storing unnecessary print data is avoided.

What is claimed is:
1. An image forming device comprising:
a sheet feeding unit capable of selectively feeding recording sheets of a plurality of sizes;
a print unit configured to print out images represented by print data on page-by-page basis, the print data including information of designated size of the recording sheets;
a control unit configured to control the sheet feeding unit to feed the recording sheets of the designated size and control the print unit to execute printing based on the print data;
a first detecting unit configured to detect running out of the recording sheets of the designated size in the sheet feeding unit; and
a storing unit configured to store the print data, and configured to temporarily store print data when the print data is printed, the storing unit comprising a volatile memory and a non-volatile memory,
wherein, on condition that the first detecting unit detects running out of the recording sheets of the designated size in the sheet feeding unit during printing out of the images, the control unit controls the sheet feeding unit to start feeding the recording sheets of a substitute size which is different from the designated size and controls the print unit to continue printing out of images represented by remaining part of the print data, which was not printed on the recording sheets of the designated size, on the recording sheet of the substitute size,
wherein the storing unit stores the remaining part of the print data even after the remaining part of the print data was printed on the recording sheets of the substitute size, the storing unit not storing part of the print data which is printed on the recording sheets of the designated size, wherein
when the print data is received by the image forming device, the storing unit stores the received print data in the volatile memory,
when the print data, which represents a corresponding image and is stored in the volatile memory, has not been printed on a designated size sheet and has been printed on a substitute size sheet, the storing unit stores the print data in the non-volatile memory different from the volatile memory, and
when the print data, which represents the corresponding image and is stored in the volatile memory, has been printed on the designated size sheet, the storing unit deletes the print data from the volatile memory and does not store the print data in the non-volatile memory different from the volatile memory.
2. The image forming device according to claim 1,
further comprising a magnification changing unit configured to change a magnification of the images represented by the remaining part of the print data based on a difference between the designated size and the substitute size,
wherein the control unit controls the print unit to print the images represented by the remaining part of the print data in accordance with the magnification changed by the magnification changing unit.
3. The image forming device according to claim 1,
further comprising a first notifying configured to notify a user that printing was executed using the recording sheets of the substitute size.
4. The image forming device according to claim 1,
further comprising a judging unit configured to judge whether print data is stored in the storing unit, wherein, on condition that the judging unit judges that the print data is stored in the store unit and running out of the recording sheets of the designated size is not detected by the first detecting unit, the control unit controls the sheet feeding unit to supply the recording sheets of the designated size and controls the print unit to execute printing based on the print data stored in the store unit.

5. The image forming device according to claim 4, further comprising:
a first acquiring unit configured to ask a user to select whether re-printing is executed and acquire a selection made by the user on condition that the judging unit judges that the print data is stored in the store unit; and
a second notifying unit configured to notify the user to supply the recording sheets of the designated size on condition that the selection acquired by the first acquiring unit is to execute re-printing.

6. The image forming device according to claim 5, further comprising a second deleting unit configured to delete the print data stored in the storing unit in on condition that the selection acquired by the first acquiring unit is not to execute re-printing.

7. The image forming device according to claim 5, wherein the storing unit stores part of print data corresponding to images printed on the recording sheets of the substitute size for each print job,
the image forming device further comprising:
a display unit configured to display a list of print jobs corresponding to the print data stored in the storing unit; and
a second acquiring unit configured to ask a user to select one of print jobs in the list displayed on the display unit and acquire the selection by the user,
wherein the control unit controls the sheet feeding unit to supply the recording sheets of designated size corresponding to the selection of the print job acquired by the second acquiring unit and controls the print unit to execute printing of print data stored in the store unit and corresponding to acquired selection of the print job.

8. The image forming device according to claim 7, further comprising a third deleting unit configured to delete the print data corresponding to the acquired selection of the print job from the storing unit.

9. The image forming device according to claim 1, further comprising a first substitute size determining unit configured to determine the substitute size based on the designated size when the first detecting unit detects running out of the recording sheets of the designated size.

10. The image forming device according to claim 9, wherein the substitute size determining unit determines another substitute size based on the designated size on condition that the first detecting unit further detects running out of the recoding sheets of the substitute size.

11. The image forming device according to claim 1, wherein the non-volatile memory comprises an NVRAM.

12. An image forming device comprising:
a sheet feeding unit capable of selectively feeding recording sheets of a plurality of sizes;
a print unit configured to print out images represented by print data on page-by-page basis, the print data including information of designated size of the recording sheets;
a control unit configured to control the sheet feeding unit to feed the recording sheets of the designated size and control the print unit to execute printing based on the print data;
a first detecting unit configured to detect running out of the recording sheets of the designated size in the sheet feeding unit;
a storing unit configured to store the print data,
wherein, on condition that the first detecting unit detects running out of the recording sheets of the designated size in the sheet feeding unit during printing out of the images, the control unit controls the sheet feeding unit to start feeding the recording sheets of a substitute size which is different from the designated size and controls the print unit to continue printing out of images represented by remaining part of the print data, which was not printed on the recording sheets of the designated size, on recording sheet of the substitute size,
wherein the storing unit stores the remaining part of the print data even after the remaining part of the print data was printed on the recording sheets of the substitute size, the storing unit not storing part of the print data which is printed on the recording sheets of the designated size,
a collecting unit which collects a plurality of pages of images represented by the remaining part of the print data to be printed on a single page of the recording sheet of the substitute size, wherein the control unit controls the print unit to print every plurality of pages of images represented by the remaining part of the print data on each page of the recording sheet of the substitute size, and the control unit determines whether the substitute size is 2N times the designated size, N being a natural number; and
a first deleting unit configured to delete the print data stored in the storing unit when the second detecting unit detects that the substitute size is 2N times the designated size, and not to delete the print data stored in the storing unit when the second detecting unit detects that the substitute size is not 2N times the designated size.

13. The image forming device according to claim 12, wherein the print unit is configured to execute printing on both surfaces of the recording sheets fed by the sheet feeding unit if the print data includes information indicative of double-side printing, and
wherein the collecting unit allocates the plurality of pages of images represented by the print data such that, when each sheet of the recording sheets of the substitute size on which the double-side and collective printing is executed is cut into pieces corresponding to the plurality of pages collected on one side thereof, two consecutive pages are on a front surface and a back surface of a same sheet.

* * * * *